(12) United States Patent
Durina et al.

(10) Patent No.: US 6,499,987 B1
(45) Date of Patent: Dec. 31, 2002

(54) POSITIVE CONTROL NON-RETURN VALVE FOR AN INJECTION MOLDING MACHINE

(75) Inventors: Michael F. Durina, Poland, OH (US); Robert E. Tompkins, Mogadore, OH (US)

(73) Assignee: MD Plastics Incorporated, Columbiana, OH (US)

( * ) Notice: Subject to any disclaimer, the term of this patent is extended or adjusted under 35 U.S.C. 154(b) by 253 days.

(21) Appl. No.: 09/593,883

(22) Filed: Jun. 14, 2000

(51) Int. Cl.[7] .............................................. B29C 39/24
(52) U.S. Cl. .................. 425/192 R; 425/559; 425/563; 425/564; 425/DIG. 225
(58) Field of Search ............................ 425/192 R, 559, 425/562, 563, 564, DIG. 224, DIG. 225; 137/528, 533.21

(56) References Cited

U.S. PATENT DOCUMENTS

| | | |
|---|---|---|
| 3,335,461 A | 8/1967 | Swartz |
| 3,438,393 A | 4/1969 | Godley |
| 3,590,439 A | 7/1971 | Swanson |
| 4,105,147 A | 8/1978 | Stubbe |
| 4,512,733 A | 4/1985 | Eichlseder |
| 4,530,605 A | 7/1985 | Eichlseden |
| 4,643,665 A * | 2/1987 | Zeiger ......................... 366/77 |
| 4,850,851 A | 7/1989 | Dinerman |
| 4,988,281 A | 1/1991 | Heathe |
| 5,002,717 A | 3/1991 | Taniguchi |
| 5,097,864 A | 3/1992 | Kuhman |
| 5,151,282 A | 9/1992 | Pray |
| 5,164,207 A | 11/1992 | Durina |
| 5,756,037 A | 5/1998 | Kitamura |

FOREIGN PATENT DOCUMENTS

| | | |
|---|---|---|
| DE | 1201039 | 9/1965 |
| DE | 2155623 | 5/1973 |
| JP | 1192521 | 8/1989 |

* cited by examiner

*Primary Examiner*—Jan H. Silbaugh
*Assistant Examiner*—Donald Heckenberg

(57) ABSTRACT

An improved positive control non-return valve assembly which is mounted on the front end of a helical plasticating screw of an injection molding machine. The valve assembly comprises a thread retainer with means for attachment to the plasticating screw. The valve assembly also comprises a distribution chamber that has an annular shaped flow gap and a cylindrical passageway that leads to a plurality of discharge ports. The non-return valve assembly forms a seal, builds pressure, and displaces molten plastic fluid from the distribution chamber through a discharge chamber passageway, and into a mold.

10 Claims, 5 Drawing Sheets

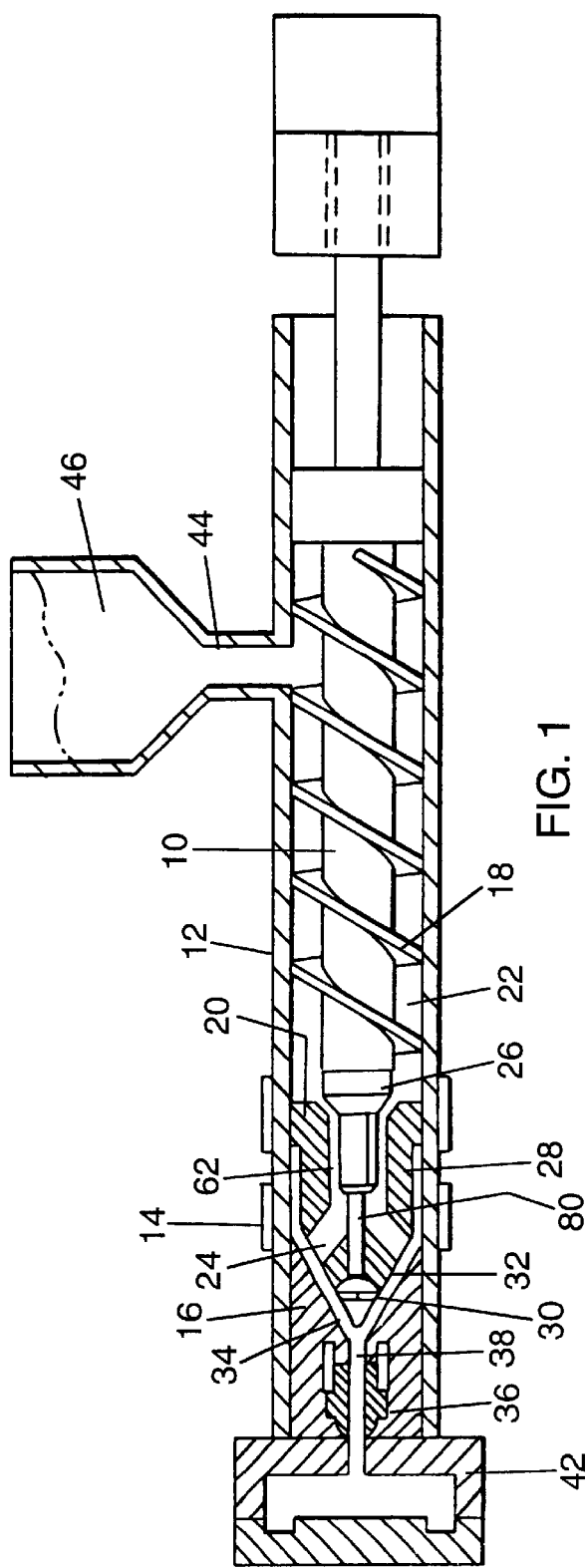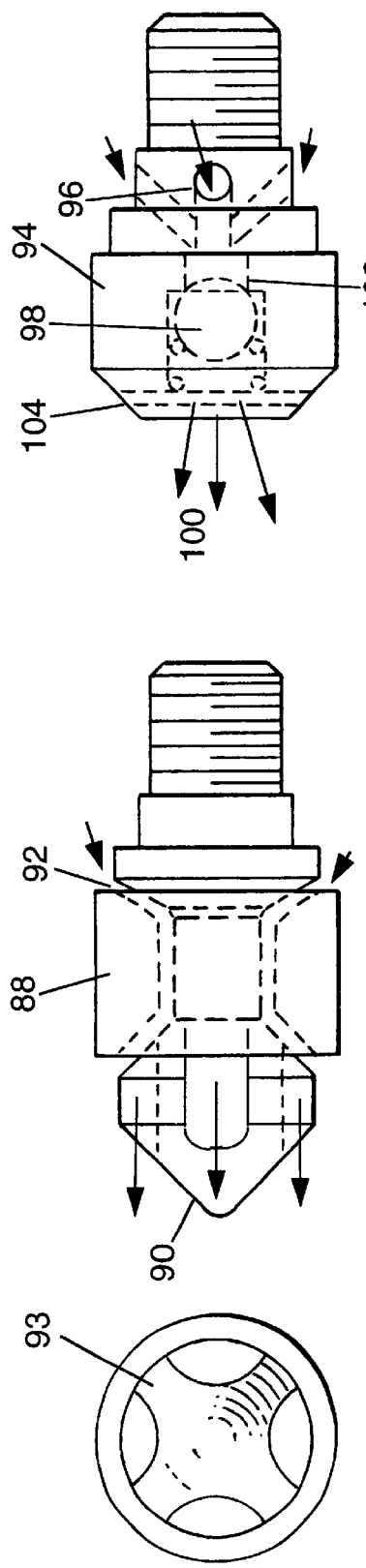
FIG. 1
FIG. 2A PRIOR ART
FIG. 2B PRIOR ART
FIG. 2C PRIOR ART

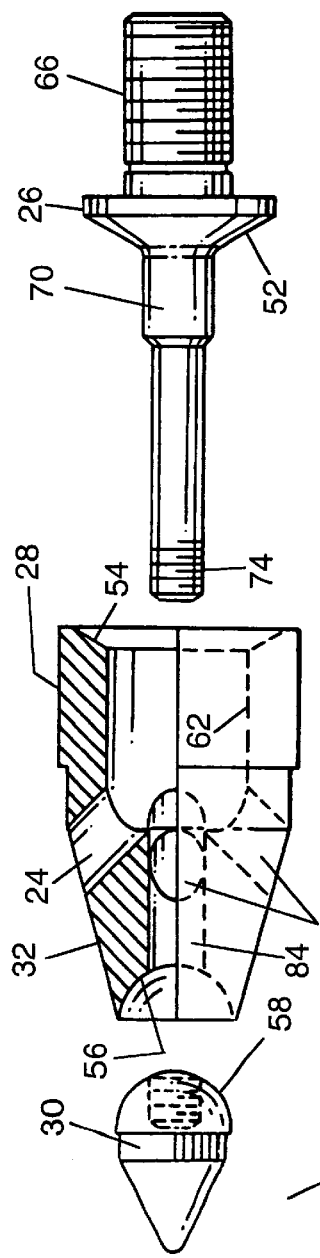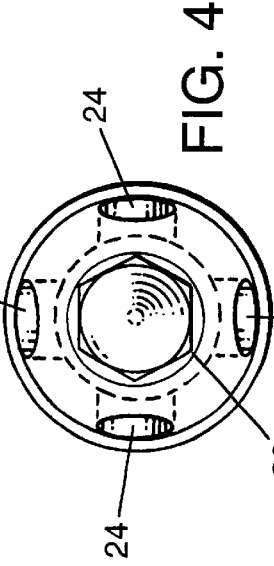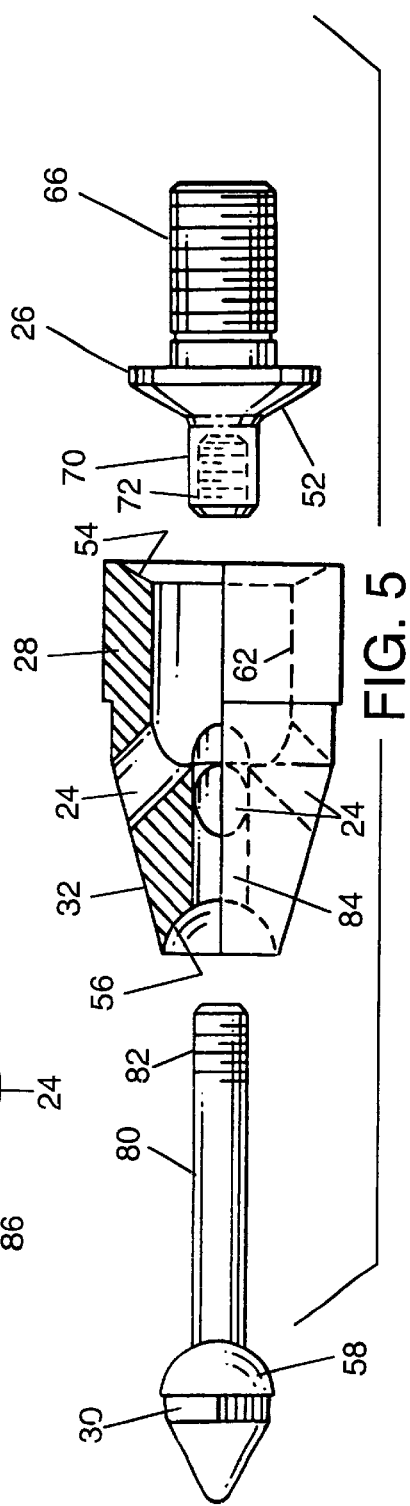

POSITIVE CONTROL NON-RETURN VALVE FOR AN INJECTION MOLDING MACHINE

BACKGROUND—FIELD OF INVENTION

The invention relates to the injection molding process, blow molding process or the like and in particular to a positive control non-return valve that controls the flow of molten plastic fluids. More specifically, the invention relates to an improved non-return valve assembly that allows the proper flow through said valve in one direction and positively stops the reverse flow of material therethrough.

BACKGROUND—DESCRIPTION OF PRIOR ART

The manufacturing process of injection molding is a primary form of manufacturing of plastic products in the world today. The demands of high molded part tolerances, dimensional stability, and shot-to-shot repeatability are increasing and better controls and mechanical components of the injection machines are required to meet the demands. A major component that contributes to this process of improvement is the plasticating unit and specifically, the non-return valve which is one of the components of the assembly. The non-return valve controls the volume of molten plastic material that is injected into the mold. Any imperfection in the operation of this component is reflected in the molded part. Imperfect molded parts cost the industry billions of dollars per year. An improvement in the non-return valve is needed to eliminate imperfect molded parts.

Injection Molding machines of the type in which the invention pertains to generally comprises an elongated helical plasticating screw which rotates and recripicates axially in a cylindrical bore of an elongated heated barrel for moving heated plastic material along the helical flight channels of the screw, from an inlet port to a discharge port where it is injected from a distribution chamber, through a nozzle and into a mold. The flow of the molten plastic material into the distribution chamber for subsequent discharge through the nozzle is controlled by the non-return valve.

A review of the prior art illustrates two primary methods/designs for controlling this process. The first is a sliding ring non-return valve which is illustrated in FIGS. 2A & 2B. The second is the ball check non-return valve which is illustrated in FIG. 2C. There of course are various alterations that change the performance slightly such as U.S. Pat. No. 5,151,282 to Dray, and my own U.S. Pat. No. 5,164,207, but none embody the changes necessary to correct the problems that plague the device as well as this invention does.

With the sliding ring design, FIG. 2A, U.S. Pat. No. 4,105,147 (1977), U.S. Pat. No. 4,643,665 (1985), U.S. Pat. No. 5,112,213 (1991), U.S. Pat. No. 4,850,851 (1989), U.S. Pat. No. 4,681,528 (1987) as examples, the sliding ring 88, becomes the shutoff mechanism which when the helical screw 10, moves foreword to displace plastic into the mold 42, engages with and forms a seal with the rear seat 92. The ring, hereby referred to as the shutoff mechanism, is free to float and is not connected to the helical screw or fluted retainer 90. This shutoff mechanism forms a fit within close proximity to barrel 12, to form a gap 48. Having a free floating unattached shutoff mechanism that is not connected to and does not rotate with either the helical screw or retainer and that is the component that forms the gap, is desirable for precise valve operation.

With the ball check valve design FIG. 2B, U.S. Pat. No. 5,097,864 (1992), the ball 98, becomes the shutoff mechanism upon screw forward movement, forming a seal with seat 102, thereby not allowing molten plastic back flow. Although this ball shutoff mechanism is free floating, it does not comprise the gap 48. The body 94, which is in close proximity to the barrel wall, rotates with the screw and acts as a bearing surface, creating frictional heat and causing adhesive wear problems between the outside diameter of the valve and the inside diameter of the barrel. This frictional heat and potential wear problem is undesirable. Even the Dray design and my own patent "The Auto-shut" valve rotate with the screw.

Common problems associated with non-return valves of this type are; a) the passage ways allowed for material flow is restricted, not allowing for ample area for which to pass which reduces the throughput, slowing down the injection molding cycle. Also, a mechanical shearing action is exerted on the material which creates frictional heat for the material, sometimes exceeding it's capacity. b) The sealing surfaces in either the ring type, ball type or Auto-shut design can become exposed to unmelted or partially melted polymeric material, inhibiting a good seal, which allows for material migration back through the valve. This lost volume of material will cause an imperfect product to be formed in the mold. Imperfect products require significant inspection costs for the manufacturer. c) The retaining areas that are designed to govern the forward movement of the shutoff mechanism during screw rotate, are forced against each other with a combination of hydraulic pressure and high rotational speeds causing them to wear adhesively. As wear occurs, the functionality of the valve begins to diminish, creating more imperfect products. d) The inability of the non-return valve and specifically, the shutoff mechanism to shutoff completely over a range of viscosity's that is normally seen in a day-to-day operation of an injection molding plant. It is not uncommon for a injection molder to process a multitude of polymers each day on the same machine requiring a valve that can operate efficiently over this wide range of viscosity's. It is our opinion that the major cause for valve shutoff failure is the differential of surface area of the shutoff mechanism from the proximal end to the distal end. The greater the differential in the positive direction, the greater the closing force, which is directly related to molded part quality. A lack of significant differential exists on most valves today, making them in-effective to operate with a range of viscosity's. When this occurs, a change of components is necessary or a change in the entire assembly is necessary which creates downtime and labor costs.

OBJECTS AND ADVANTAGES

Accordingly, several objects and advantages of the invention are listed herein including but not excluding:

a) to provide a non-return valve that uses mathematical and Theological analysis to calculate not only cross sectional area but polymeric shear rates when designing the stroke of the body and volumetric passageways through the valve. During the screw recovery phase of the injection molding cycle the molten plastic fluid is pumped along the flight channels until it engages the proximal end of the body, urging it forward and providing an annular passageway for the fluid to flow. The annular passageway leads to a cylindrical geometry that leads to a conical portion that leads to a plurality of cylindrical ports that leads through the valve exiting to the discharge chamber. Generous radii are provided along with smooth passageways so as not to induce shear concentration points. The design lends itself to ease of manufacturing;

b) to provide a non-return valve that through it's design offers a significant mechanical advantage during the most critical shutoff phase of the injection molding cycle. By virtue of the inventions significant frontal area specifically the differential between the frontal area and the rearward area of the shutoff mechanism, the large mass and increase in the length of engagement, which all contribute to the valves closing force, the performance is significantly improved over the industry standard components. This significant increase in the closing force equates to energy that is used to finish melting the partially melted polymer and assure more consistent shutoff performance, c) to provide a non-return valve that has a improved design of the retaining members that govern the forward movement of the shutoff mechanism. The invention's design incorporates a large spherical seat area constructed of high wear resistant materials. The spherical geometry assures that there will be uniform and equal contact between the two mating components even though the axis of the body does not remain the same as the axis of the spherical retainer when the molten plastic fluid is being pumped through the valve. Perpendicular surfaces or conical surfaces which are commonly used do not assure even surface contact and hence lead to high stress concentration areas and premature wearing of the components. In addition, the significant frontal area of the shutoff mechanism that is forward of the discharge plane acts as a counter force which lessens the total force being applied between the two mating sealing areas, thereby extending the wear life. This fact is believed to be unique amongst the industry standard designs;

d) to provide a non-return valve whose member that is attached to, and rotates with, the plasticating screw, has a geometry that offers little torsional resistance to the molten plastic fluid and occasional solid phase polymeric material so as not to have the tendency to break or fail torsionally. The inventions rotating attached member, 70,80, is cylindrical in nature with a generally inscribed polygon installed for ease of removal. The polygon that is close in proximity to the diameter of the shaft is significantly less likely to resist the flow of the polymeric material than the industry standard non-return valves, thus transmitting torque to the shaft that ultimately leads to torsional failure;

e) to provide a non-return valve that has a significant mechanical advantage during the shutoff or closing phase of the injection molding cycle that allows it to operate over a wider range of viscosity's, delivering shutoff performance that is unmatched with the known existing technology. By virtue of the inventions significant frontal area, specifically the differential between the frontal area and the rearward area of the shutoff mechanism, the large mass and increase in the length of engagement, which all contribute to the valves closing force, the performance is significantly improved over the industry standard components. The magnitude of difference in closing force is enough to supply shutoff performance over the wide range of viscosity's that are encountered in the injection molding process, thereby eliminating the need to modify or replace the non-return valve.

BRIEF DESCRIPTION OF THE DRAWINGS

The invention will be more clearly understood by reference to the attached drawings in which:

FIG. 1 is a cross sectional view of the plasticating unit of an injection molding machine including the invention, positive control non-return valve;

FIG. 2A is a side view of PRIOR ART showing a sliding ring check valve;

FIG. 2B is a end view of said sliding ring check valve;

FIG. 2C is a side view of PRIOR ART showing a ball check valve;

FIG. 3 is an exploded view showing the main embodiment of the positive control non-return valve;

FIG. 4 is an end view of said assembled valve;

FIG. 5 is an exploded view showing a second embodiment of said valve;

DESCRIPTION OF THE PREFERRED EMBODIMENTS

Figure 6:
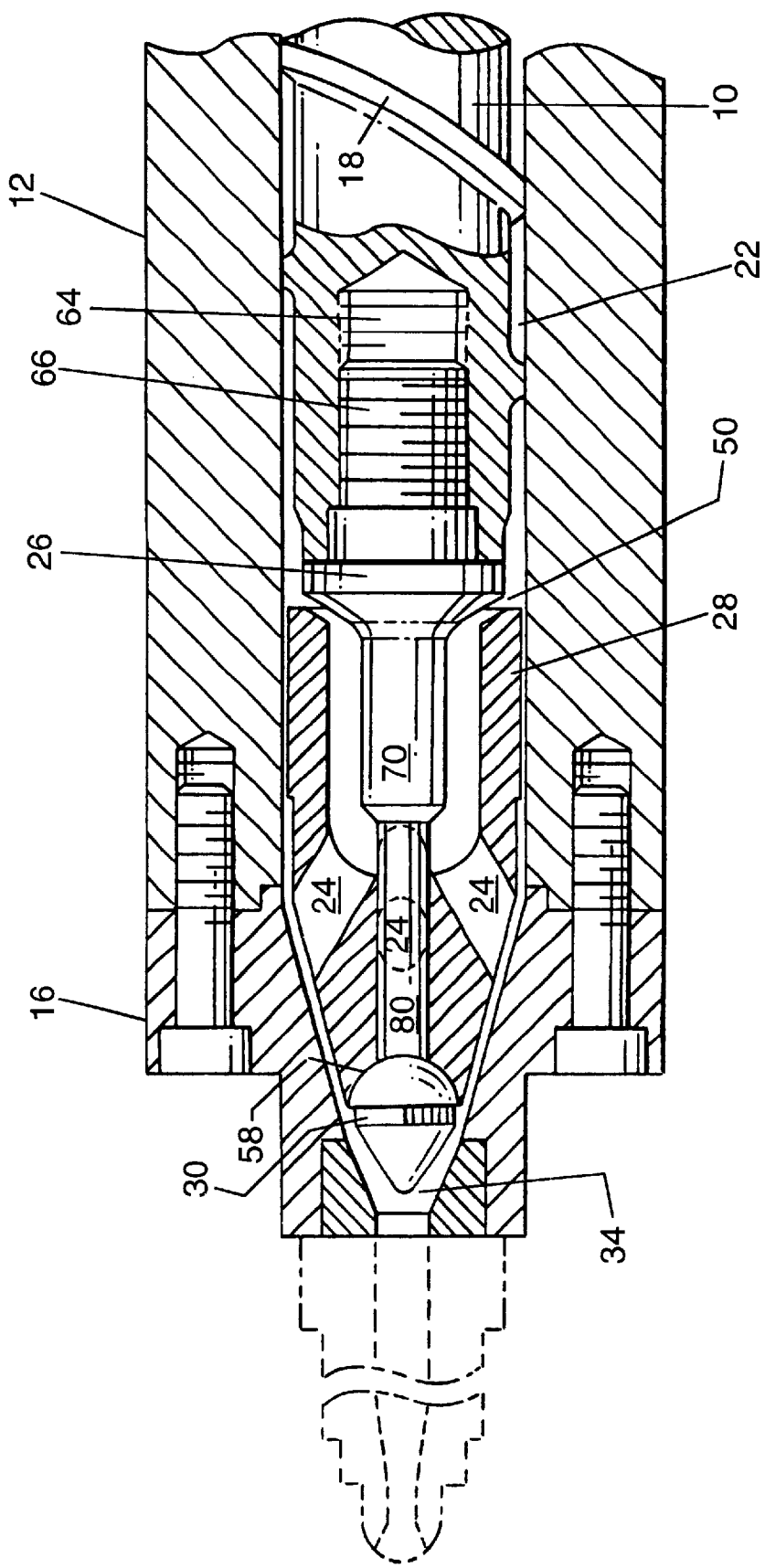
FIG. 6 is an enlarged sectional detail showing said valve assembly.

FIG. 1 represents a cross sectional view of a plasticating unit for an injection molding machine. The plasticating unit includes a heated elongated barrel 12 enclosing a reciprocating and rotating helical screw 10 which is fed plastic pellets 46 through a material hopper 44. The screw 10 comprises a helical flight 18 that forms a channel 22 for conveyance of the plastic pellets from the inlet section along the axis while the apparatus is heated by heaters 14 so that the pellets become melted during transit within barrel 12. This operation and apparatus is described more fully in U.S. Pat. No. 4,752,136.

The positive control non-return valve of the invention is located at the forward end of the rotating screw 10 and is indicated generally at 20 in FIG. 1. The non-return valve is shown in the open position in FIG. 1 with passageways 62 and 24 leading to a distribution chamber 34 that is formed by said barrel 12 and endcap/nozzle adapter 16. The molten plastic fluid discharges from the distribution chamber 34 through the distribution chamber passageway 38 through a nozzle 36 and into a mold 42.

Prior Art work is depicted by a sliding ring valve FIG. 2A, 2B and a front discharge ball check valve 2C. The most common type of sliding ring valve is comprised of a ring 88 rear seat 92 and retainer 90 which has generally large fluted sections 93 for material passageways. The most common type of ball check valve is comprised of a inlet port 96 a main body 94 rear seat 102 a ball 98 pin retainer 104 and a discharge passageway 100.

The positive control valve shown as the main embodiment in an exploded view FIG. 3, generally comprises a thread retainer 26 that has a proximal section 66 that attaches to the plasticating screw that leads to a generally conical seat sealing area 52, a shaft portion 70 that extends telescopically forward along the screw axis, a means for attachment 74 to a spherical retainer 30 on the distal end. The thread retainer 26 may or may not be integral to the plasticating screw 10. The body 28, which is sandwiched between said thread retainer 26 and said spherical retainer 30 when assembled, is free floating and unattached, has a complementary conical sealing area 54 to form a seal with complimentary sealing area 52 during screw injection forward. The passageway for the molten plastic fluid is generally cylindrical in geometry and is represented by 62, FIG. 3, which lead to a plurality of outlet ports 24 that are also generally cylindrical in geometry. A body 28 that has an outer periphery that is cylindrical in geometry on the proximal end, for a given length within cylindrical barrel 12, that leads to a cone, specifically a truncated conical geometric shape that proximate somewhat the cone that is formed by the endcap/nozzle adapter 16. A plurality of discharge ports 24 that form a discharge plane 68 that occur downstream or forward of said formation of cone. A conical portion of said body 28 that leads to a frustum, generally a concave sphere that forms the front spherical retaining area 56 and a bored through clearance hole 84 of a somewhat larger in diameter than said shaft 70. The shaft 70 of said thread retainer 26, that fits within the longitudinal bore 84 of said body when the valve is assembled, so that there is ample clearance to support free movement. A shaft 70 that on the distal end, has a means for attachment to a spherical retainer 30, which when assembled governs the forward movement of body 28, which is sandwiched, and during screw rotation, urges the engagement of spherical surfaces 58 and 56. A spherical retainer 30, having generally a polygon installed 86, FIG. 4, to the surface for ease of installation and removal with a wrench.

An assembled positive control valve FIG. 6, shown attached to screw 10, via rearwardly extended external threads 66, and a internally threaded bore 64 of said screw, thereby providing a means for attachment. Said thread retainer 26, fitting flush against front face of said screw so as not to cause a gap, extending telescopically forward to accept said spherical retainer 30 forming an assembly, retaining said body and governing the axial forward movement of the same. Said assembly, forming a barrier between said barrel 12 so that the plastic fluid in channel 22 is forced to flow through the annular opening 50, that is naturally formed between two generally conical surfaces 52, 54. The plastic fluid being pumped through said valve assembly and out through discharge ports 24, which may vary in number, and into distribution chamber 34 for subsequent discharge into mold 42.

Figure 7A:
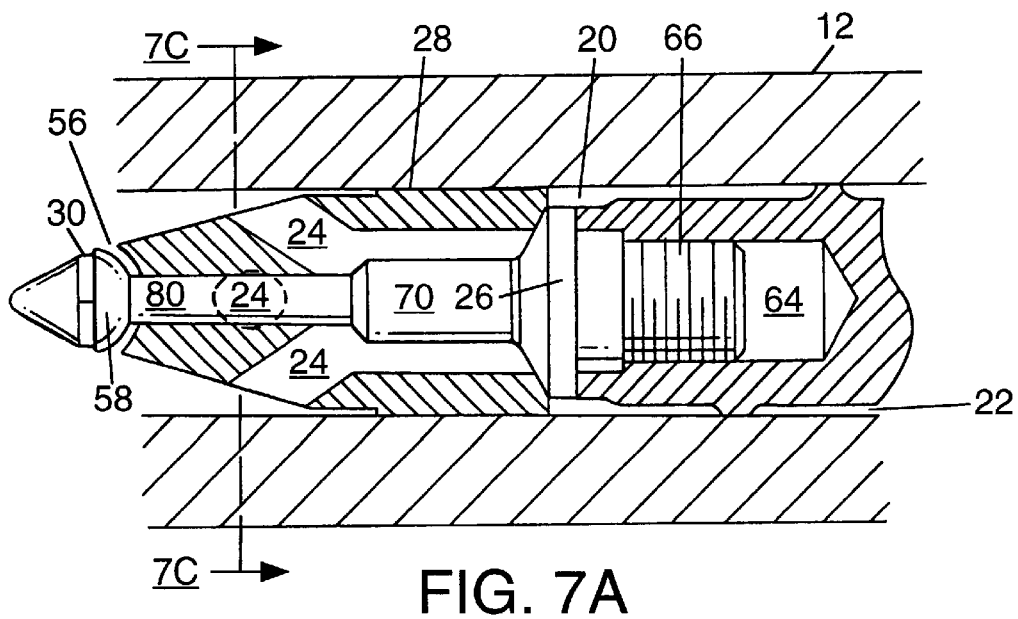
FIG. 7A is an enlarged sectional view showing said valve in the closed position.

A positive control non-return valve shown in the closed position FIG. 7A, while in the screw forward portion of the injection molding cycle. When screw forward motion occurs, the spherical retainer 30, and thread retainer 26, which forms an assembly with and is attached to said screw 10, moves forward while the molten plastic fluid acts on the large projected outer peripheral area of said body 28 to urge said seat of body 54 to meet with seat 52, of said thread retainer 26, thus forming a seal and allowing said valve assembly to prevent material backflow.

Figure 7B:
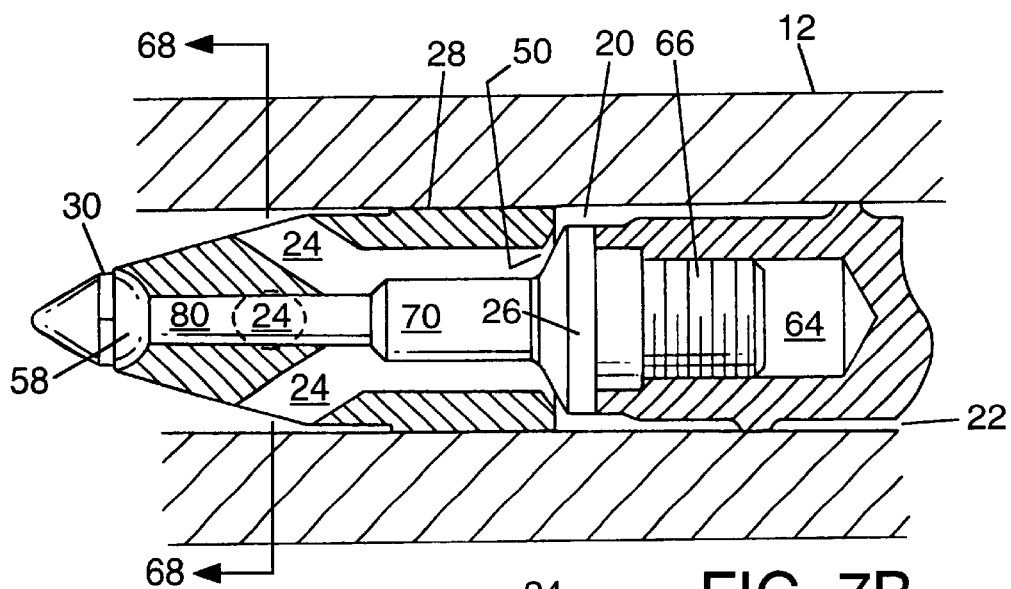
FIG. 7B is an enlarged sectional view showing said valve in the open position.
Figure 7C:
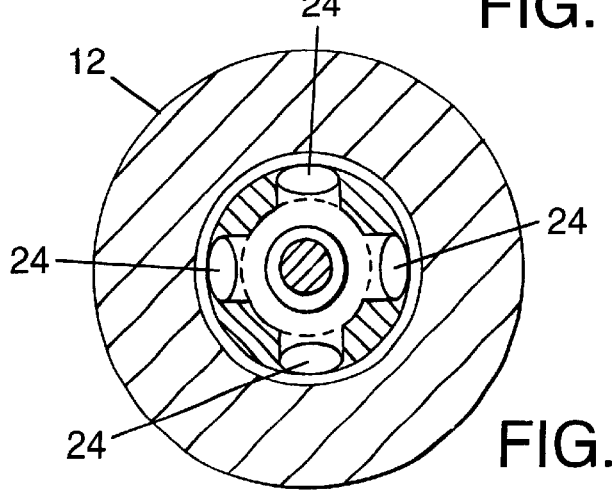
FIG. 7C is an enlarged sectional view as taken through section 7C—7C on FIG. 7A.

A positive control non-return valve assembly while in the open position, FIG. 7B, the body 28 is urged forward and area 58 and 56 are engaged to govern the movement of said body that is sandwiched between said components. The distance traveled comprises the stroke of the valve and is predetermined. The discharge plane 68, that is shown in FIG. 7B, is the point where the plastic fluid flows out of the body 28, which constitutes the shutoff mechanism. A shutoff mechanism 28 that has a substantial surface area forward of the discharge plane 68. FIG. 7C, showing a rear projected area of said shutoff mechanism 28, where the aerodynamic design of the internal cylindrical and conical geometry's lead to a plurality of discharge ports.

Figure 8:
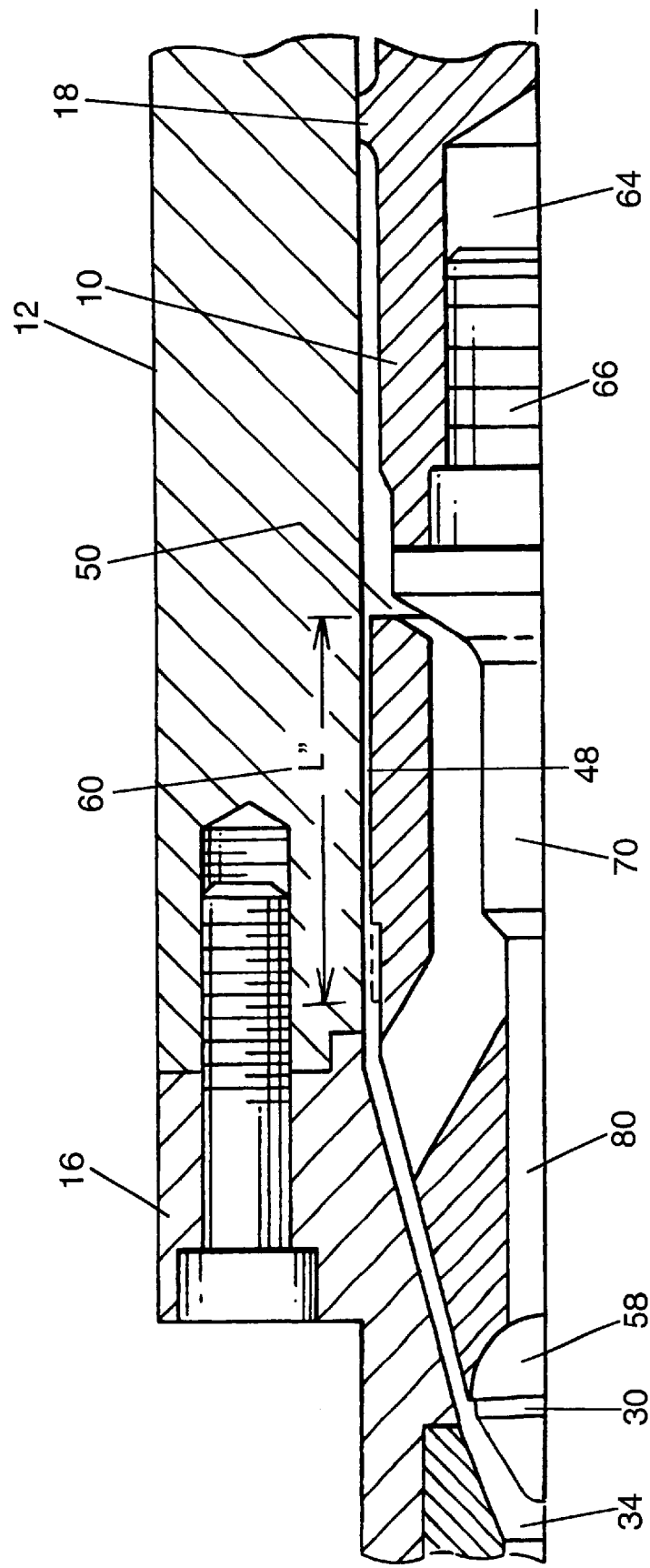
FIG. 8 is an enlarged partial sectional view showing the details of flow and gap of said valve.

The shutoff mechanism 28 of the positive control non-return valve is fit within close proximity of said barrel 12 so as to form a gap 48, FIG. 8 (typically within 0.002/0.003" diametrical clearance on a 2.00" diameter valve) only large enough to allow for free movement between said components, to prevent backflow during screw forward movement and to urge the molten plastic fluid through the inside diameter of said shutoff mechanism during screw rotation. The gap 48 that is formed and the length of close proximal engagement "L", 60, between said shutoff mechanism and said barrel combine to form an assembly that prevents backflow due to leakage around the circumference. A shutoff mechanism 28 that has a substantial projected frontal area that creates a substantial closing force during screw forward movement, that forms a positive seal between components 52 and 54 that prevents backflow due to leakage through the valve assembly.

OPERATION

The functioning of the injection molding machine, the plasticating unit and specifically the non-return valve of this invention are briefly described as such: The screw 10 rotates and accepts plastic pellets 46 through a feed opening 44 and flight channel 22 which conveys material forward along said flight channel 22 that is formed along with the barrel 12. The plastic pellets while being conveyed, picks up energy from shear and the heaterbands 14 becoming mostly molten and fluid, and is pumped through said non-return valve 20 into a distribution chamber 34, displacing volume and recipricating rearward to a predetermined set point where screw rotation stops. The mold 42 being empty, is filled when the screw is moved forward, and a seal is created by said non-return valve. The preciseness of the screw movement and the non-return valve functioning determine the molded part quality. For this reason, said non-return valve is vital to this operation and an improvement is welcome and needed.

As the molten plastic fluid is conveyed forward of the end of the screw, it confronts with the rear projected area 76 and 54 of the body 28 which is a free floating un-attached shutoff mechanism, and the interface of the barrel inside diameter and the body outside diameter which forms a tight fit, and urges the body to separate from the seat sealing area 52 of the thread retainer 26 forming a annular opening 50 for the fluid to advance. The fluid urges the body forward until the front spherical retaining area of said body 56 meets with the contact area of said spherical retainer 58. The total axial movement is predetermined and defines the stroke of said valve assembly. The fluid then proceeds axially forward through the longitudinal cylindrical bore of said body 62 until it confronts the interface of the plurality of discharge ports 24 the shaft 80 and bore 84. The clearance between said shaft and said bore is minimal, only to allow for free rotation between the components and the passageway is closed at the distal end where the spherical retainer 30 is attached, thus urging the fluid to pass through passageway 24. The distal end of passageways 24, constitute the discharge plane 68. In relation to the outer periphery of said body, the discharge plane 68 is positioned on the conical portion, after the angle has formed. The discharge of fluid through the passageways 24, displaces volume in the distribution chamber 34 thereby urging said screw assembly axially rearward until it reaches said predetermined set point and stops. The positive control non-return valve of this invention that utilizes a free floating un-attached shutoff mechanism 28, has a substantial portion of its member that creates frontal area forward of the discharge plane 68, which is unique in the industry to our knowledge. During screw rotation, said substantial frontal area acts to supply a counter hydraulic force in the rearward direction. Normally, viscous drag, hydraulic force of the fluid and frictional drag between the barrel 12 and the body 28 act in the forward direction only creating a wear problem between the mating components. This unique feature of said invention lessens the force urging areas 56 and 58 together thereby extending wear life. The spherical geometry of said components assures that a uniform contact area is maintained through the cycle even though the shutoff mechanism 28 will move off of its center axis from time to time, and form an eccentric orbit.

When the screw 10 and attached components 26 and 30 move axially forward during the injection forward phase of the injection molding cycle, the shutoff mechanism 28, should remain in relative stationary axial position until seat sealing area 54 comes in contact with seat sealing area 52 of the thread retainer, and forms a seal. At the same time, a seal is formed between the barrel 12 and shutoff mechanism 28 because of the minimal clearance between the components, that comprises the gap 48. Closing time, that is determined by the injection speed of said screw and the stroke of the valve 20 that is predetermined, should occur as close to theoretical as possible. It is our opinion that the closing force that controls this function is mostly dependent upon:

1. The length of engagement "L" shown in FIG. 8, 60.
2. The gap 48 shown in FIG. 8.
3. The frontal area of the shutoff mechanism 28, specifically, the differential between the projected frontal area and the rear projected area.

The frontal area of said invention is the truncated conical area of said shutoff mechanism 28, the frustum and the concave sphere 56 at the distal end. The positive control shutoff valve of said invention, to our knowledge, has a substantially greater differential of frontal projected area verses rear projected area than any other shutoff mechanism in use or patented to date.

The features of said invention including; a shutoff mechanism 28 that is free floating and un-attached, a gap 48 that is minimal, a "L" dimension, 60, that is substantially longer than the industry standard valve, and a substantial differential between the frontal projected area verses the rear projected area of said shutoff mechanism, allows for a closing force that is unmatched in the industry.

We claim:

1. A positive control non-return valve assembly for an injection molding machine, said molding machine comprised of an elongated helical plasticating screw that rotates about an axis and reciprocates along said axis within a heated barrel to discharge molten plastic material through said non-return valve assembly at a discharge end of said screw, said non-return valve assembly comprised of at least two independent components, said non-return valved assembly comprising:
    a) a thread retainer that has a means for attachment to, or is integral with, said screw, the threat retainer having a first portion that is generally cylindrical a second portion that is generally conical and a third portion that is generally cylindrical and extending telescopically forward along said axis with a means for attachment to a spherical retainer;
    b) a free rotating unattached shutoff mechanism that is sandwiched between said thread retainer and said spherical retainer, having an outer periphery that is first cylindrical, a second portion that is generally conical leading to a frustum, said frustum having generally a spherical concave facial with a cylindrical thru-hole; and
    c) said spherical retainer with a means for attachment to said thread retainer that when attached governs the axial forward movement of said free rotating unattached shutoff mechanism, that employs a spherical seat retaining area and a means for installation and removal.

2. The positive control non-return valve assembly of claim 1, wherein said free rotating unattached shutoff mechanism has a generally conical seat sealing area that is complementary to a sealing area of said thread retainer, and a cylindrical longitudinal bore that forms an inner diameter leading to a conical portion that comprises a plurality of generally cylindrical discharge ports.

3. The positive control non-return valve assembly of claim 2, wherein said discharge ports extend from said inner diameter of said free rotating unattached shutoff mechanism, forming an angle relative to said axis, said discharge ports exiting to said conical portion of said outer periphery of said free rotating unattached shutoff mechanism which is forward of said cylindrical shaped portion of said free rotating unattached shutoff mechanism.

4. The positive control non-return valve assembly of claim 3, wherein said discharge ports form a discharge plane which is located axially forward of the cylindrical portion of said free rotating unattached shutoff mechanism.

5. The positive control non-return valve assembly of claim 4, wherein said free rotating unattached shutoff mechanism exhibits a substantial portion of said conical outer periphery and said frustum axially forward of said discharge plane.

6. The positive control non-return valve assembly of claim 5, wherein said frustum having the generally spherical concave facial at the distal end meets with said spherical retainer that comprises said complementary shaped spherical seat retaining area that governs the axial forward movement of said sandwiched free rotating unattached shutoff mechanism.

7. The positive control non-return valve assembly of claim 6, wherein said free rotating unattached shutoff mechanism comprising said inner diameter which is cylindrical from the proximal end to the distal end, said proximal end being larger in diameter than distal end, said inner diameter acting first as a passageway for molten plastic fluid and second as a clearance hole for telescoping shaft of either said thread retainer or said spherical retainer.

8. The positive control non-return valve assembly of claim 7, wherein the surface area of the distal end of the free rotating unattached shutoff mechanism exposed to molten plastic fluid is substantially greater than the surface area of inner diameter of the free rotating unattached shutoff mechanism exposed to molten plastic fluid thereby creating a differential of surface area exposed to molten plastic fluid.

9. The positive control non-return valve assembly of claim 8, wherein the differential of surface area of the free rotating unattached shutoff mechanism exposed to molten plastic fluid is comprised of said conical portion of said outer periphery and said frustum which is forward of said cylindrical shaped portion.

10. The positive control non-return valve assembly of claim 1, wherein said thread retainer has a means for ease of installation and removal.

* * * * *